United States Patent
Yamada

(10) Patent No.: US 7,395,357 B2
(45) Date of Patent: Jul. 1, 2008

(54) INFORMATION PROCESSING APPARATUS AND COMPUTER READABLE MEDIUM

(75) Inventor: Akihiro Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 289 days.

(21) Appl. No.: 11/256,068

(22) Filed: Oct. 24, 2005

(65) Prior Publication Data

US 2006/0095145 A1    May 4, 2006

(30) Foreign Application Priority Data

Oct. 22, 2004    (JP) .............................. 2004-307907

(51) Int. Cl.
  *G06F 3/00*    (2006.01)
  *G06F 15/00*    (2006.01)
(52) U.S. Cl. .............................................. 710/5; 710/8
(58) Field of Classification Search .............. 710/1–14; 707/1, 527; 358/1.15–1.18
  See application file for complete search history.

(56) References Cited

U.S. PATENT DOCUMENTS 5,257,368 A * 10/1993 Benson et al. .................. 707/1
5,832,298 A * 11/1998 Sanchez et al. ................. 710/8
6,647,437 B2 * 11/2003 Ackerman et al. ............. 710/14
2001/0056449 A1 * 12/2001 Kawamoto et al. .......... 707/527
2005/0275852 A1 * 12/2005 Ferlitsch ...................... 358/1.6
2006/0045597 A1 * 3/2006 Leslie et al. ................... 400/76

FOREIGN PATENT DOCUMENTS

JP    A 10-289077    10/1998

* cited by examiner

*Primary Examiner*—Christopher Shin
(74) *Attorney, Agent, or Firm*—Oliff & Berridge, PLC

(57) ABSTRACT

A PJL processing program for executing a process corresponding to a PJL command received from the host includes a command option recognizing program for recognizing the PJL command, the option dictionary for storing the information name (option name) which is capable of corresponding to a request by the PJL command and associated with the location of the corresponding information, and an option executing program for executing a process corresponding to the request when the information of the requested object exists in the option dictionary. The option dictionary is stored in the flash ROM while the command option recognizing program and the option executing program, which have little possibility to be changed, are stored in the mask ROM.

17 Claims, 11 Drawing Sheets

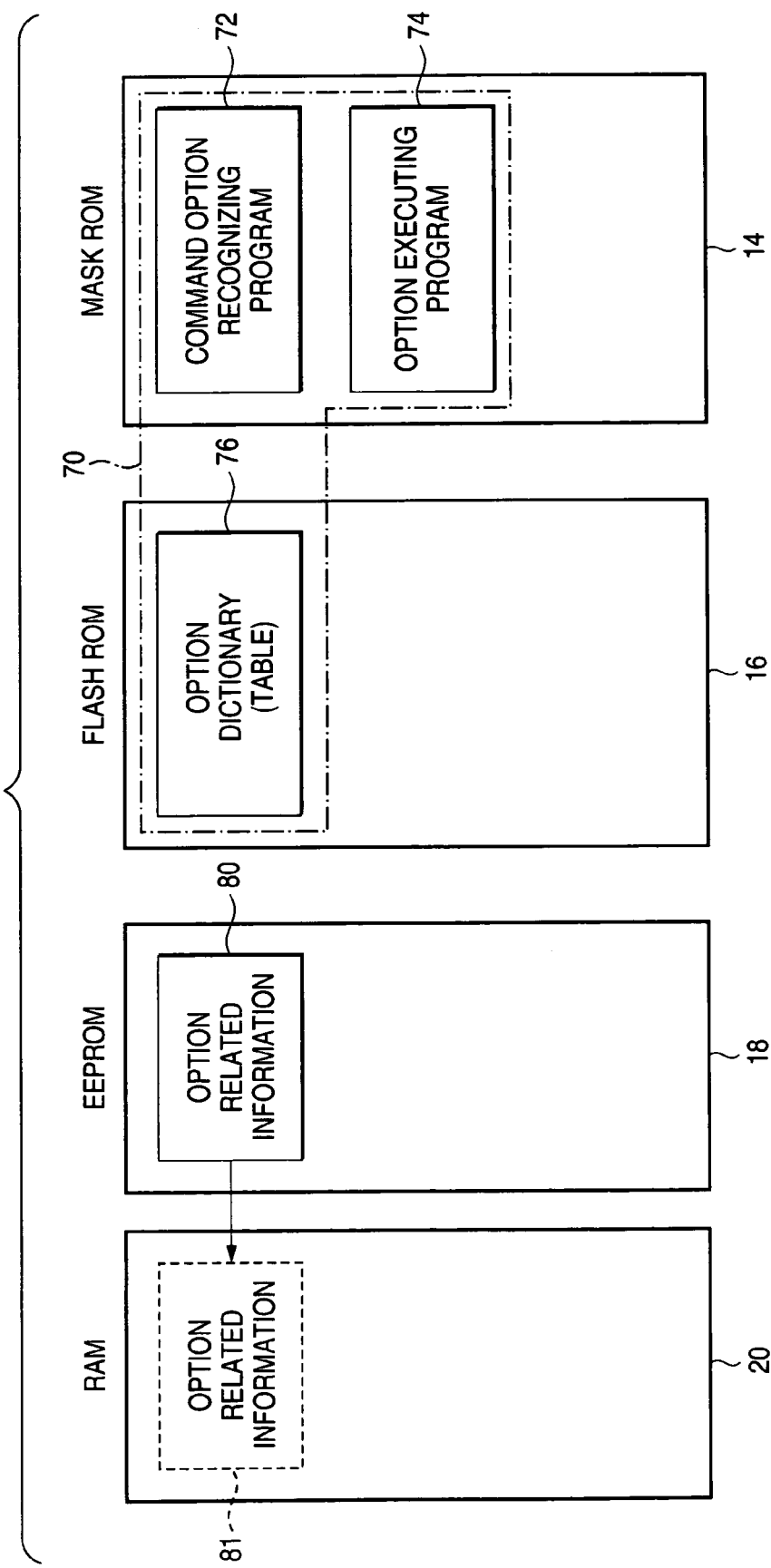

COMMAND LIST

| SET |
| DEFAULT |
| INQUIRE |
| DEINQUIRE |
| INFO |
| ⋮ |

OPTION DICTIONARY (TABLE) (76)

| OPTION NAME | EEPROM_ID | ... |
|---|---|---|
| COPIES | NV_COPIES_ID | ... |
| PAPER | NV_PAPER_ID | ... |
| LANG | NV_LANG_ID | ... |
| XOFFSET | NV_XOFFSET_ID | ... |
| TIMEOUT | NV_TIMEOUT_ID | ... |
| TOTALPAGE | NV_TOTALPAGE_ID | ... |
| ⋮ | ⋮ | ⋮ |

FIG. 5A

ACQUIRE TOTAL PAGE (PAGE COUNTER)

TRANSMITTING DATA FROM HOST (50):
```
<ESC>%-12345X@PJL<CR><LF>
@PJL DINQUIRE TOTALPAGE<CR><LF>
@PJL INQUIRE TOTALPAGE<CR><LF>
<ESC>%-12345X
```

TRANSMIT ↓ ↑ RESPONSE

RESPONSE DATA FROM MULTI-FUNCTION MACHINE (10):
```
@PJL DINQUIRE TOTALPAGE<CR><LF>
500<CR><LF
@PJL INQUIRE TOTALPAGE<CR><LF>
500<CR><LF>
<FF>
```

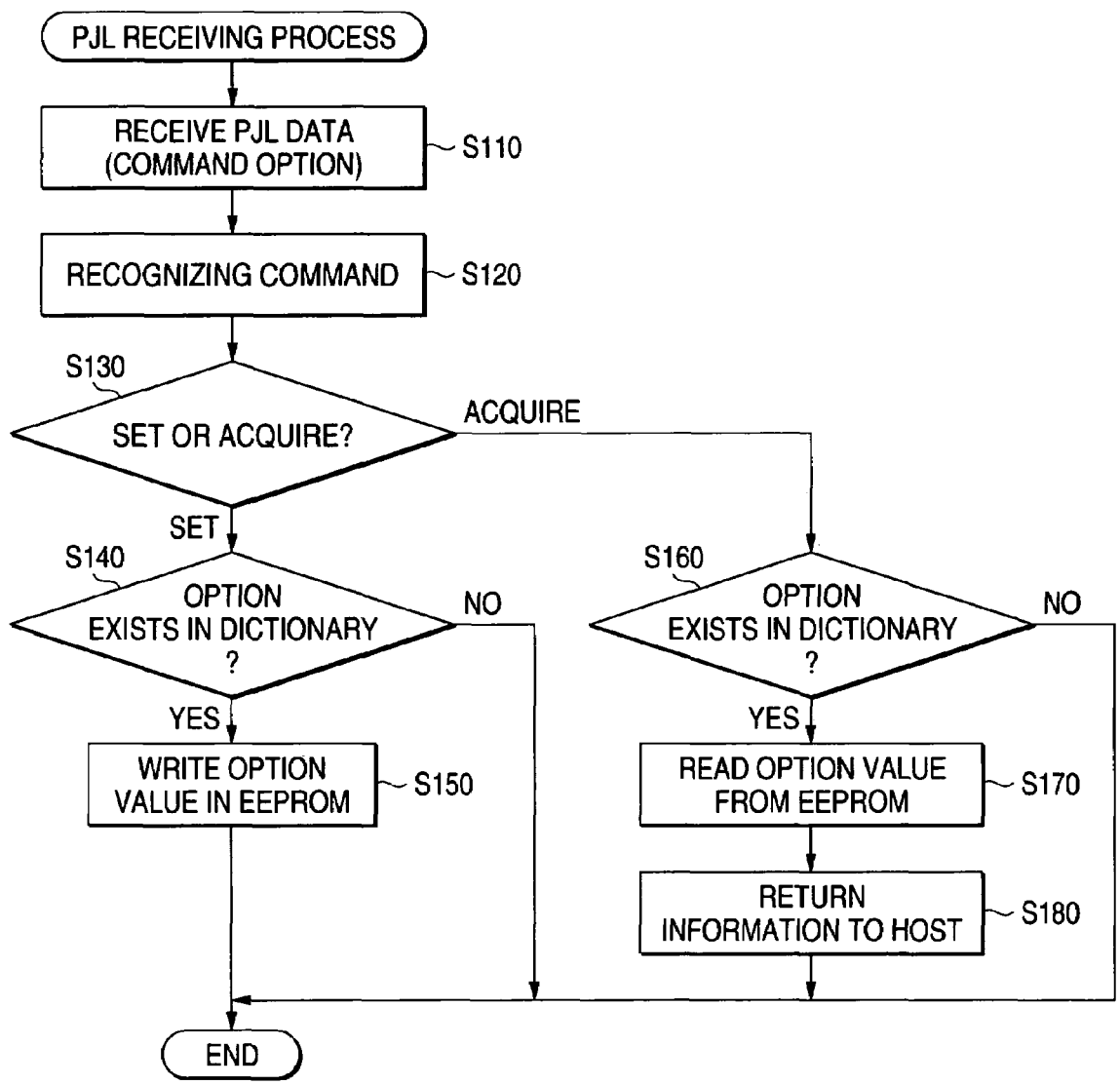

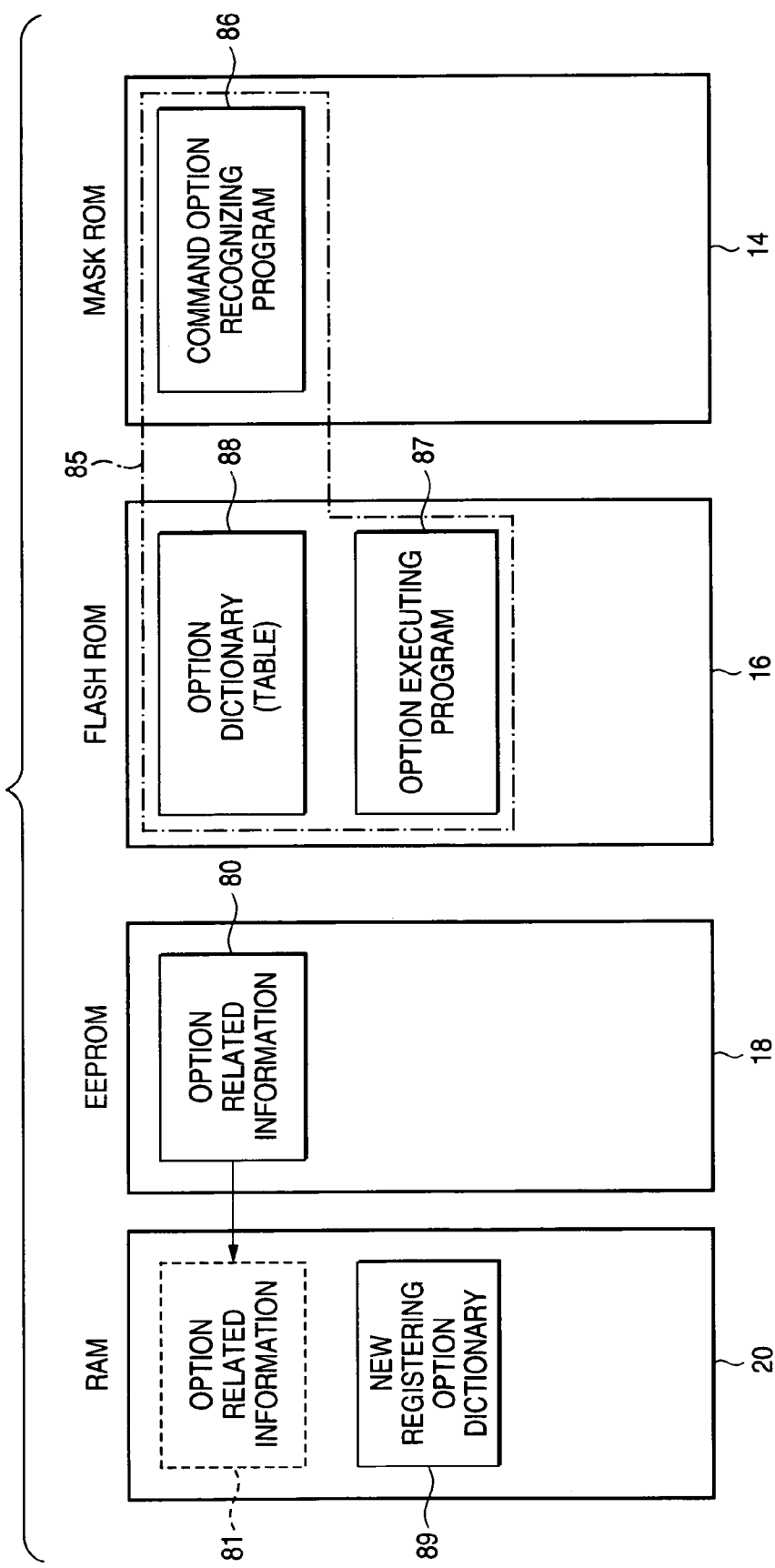

INFORMATION PROCESSING APPARATUS AND COMPUTER READABLE MEDIUM

CROSS REFERENCE TO RELATED APPLICATION

This application claims priority from Japanese Patent Application No. 2004-307907, filed on Oct. 22, 2004, the entire subject matter of which is incorporated herein by reference.

TECHNICAL FIELD

Aspects of the present invention relate to an information processing apparatus which is capable of acquiring and changing information inside of the apparatus according to a request from externals devices, and capable of responding to the information requested to a requesting destination in the case of an acquiring request, and to a corresponding information adding program used in the information processing apparatus.

Conventionally, in a printing apparatus such as a serial printer, a page printer, and so on, each printing operation is executed by storing each program or a parameter, which corresponds to every printing process, in a ROM as firmware.

As the printing apparatus, there is a well-known technique which includes two ROMs such as a mask ROM whose data cannot be rewritten and a flash ROM (non-volatile) whose data can be rewritten. The technique stores an initial operation program for controlling a state capable of being operated in the lowest limit and a rewriting program for updating programs of the flash ROM in the mask ROM. The technique also stores each controlling program corresponding to printing processes in the flash ROM (for example, see JP-A-10-289077).

According to above-described technique, even if malfunction is generated in the controlling program in the flash ROM, at least initial operation can be performed in the lowest limit by the initial operation program internal of the mask ROM. Because the controlling program exists in the flash ROM, the controlling program may be changed, added, or deleted according to need.

Furthermore, there is a program (hereinafter, refer to 'PJL processing program') which analyzes a PJL command and executes a predetermined process corresponding to one controlling program which may be changed, added, or deleted. The PJL processing program, for example, when, in a printing side, receiving a command (hereinafter, refer to 'PJL command') described by a printer job language (PJL) in order to acquire each information inside of the printing apparatus from a computer capable of communicating with the printing apparatus, performs to respond to the information or change the internal information according to the command. The information that responds to the computer side from the printing apparatus according to the command is read-back in the computer side.

The PJL, developed by Hewlett-Packard Development Company, L.P., is a command language enabling to control each function of the printing apparatus, has been well-known, and used in other company. The PJL command has various specifications which expends individually according to the differences such as a maker or a kind of the printing apparatus.

In the PJL processing program, there is dictionary (table) registering information, inside of the printing apparatus, which is capable of corresponding to the PJL command and associated with the location information which indicates the location of the above-described information. In the case of acquiring new information as well as the information registered in the dictionary or enabling to change the setting status, it is necessary to add new association of the information name and location of the information according to the new information in the PJL processing program. That is, contents of the PJL program may be changed according to a user or a using state.

Therefore, the PJL processing program stores memory contents in the flash ROM capable of rewriting the memory contents not in the mask ROM so as to change the memory contents according to need.

SUMMARY

In these days, while functions of the printing apparatus tend to be diversified and sophisticated, various programs and data are accumulated on a flash ROM as well as a PJL processing program. As a result, the capacity of the flash ROM may be insufficient contents or the multifunction of the printing apparatus may be obstructed.

In order to solve the insufficient capacity of the flash ROM, it is technologically possible to prepare a high capacity flash ROM, but the cost naturally increases with the high capacity flash ROM though the above problem is solved. Accordingly, because of the cost, it is not practical to simply increase the capacity of the flash ROM and it is desired to solve the problem without increasing the capacity of the flash ROM.

The present invention provides an information processing apparatus that controls the amount of free space of a ROM such as a flash ROM capable of rewriting so that other programs may efficiently use the ROM capable of rewriting by storing a program for acquiring or setting internal information of the apparatus.

An information processing apparatus according to the present invention includes: a storage unit for storing a program and a controlling unit for controlling the entire device based on the program stored in the storage unit. The program includes a command processing program for determining whether acquiring or setting device information corresponding to a command which request to acquire or set the device information of the corresponding information processing apparatus.

The command processing program includes a table part and an analyzing program part. The table part includes a device information name, which indicates the kind of the device information corresponding to the request of the command, with location information which indicates the location of the device information. The analyzing program part analyzes contents of the command and acquires the location information corresponding to the device information based on the table unit.

The storage unit includes a first storage unit which is not capable of rewriting the stored contents, and a second storage unit which is capable of rewriting the stored contents. The analyzing program part is stored in the first storage unit. The table part is stored in the second storage unit.

In the information processing apparatus, all of the command processing programs are not stored in the second storage unit but only the table part of the command processing program is stored in the second storage unit so as to be changed later. The analyzing program part is stored in the first storage unit. The controlling unit, when the command is inputted, analyzes the command based on the analyzing program part stored in the first storage unit, acquires location information of requested device information based on the table part stored in the second storage part. Accordingly, a predetermined process (acquiring, setting, and so on) is executed by accessing the requested device information.

According to the information processing apparatus, because the analyzing program part of the command processing program is stored in the first storage unit, the area occupied by the command processing program in the second storage unit can be reduced and the other programs can effectively use the second storage unit.

In order to acquire or set new device information except for the device information corresponding to the device information name included in the table part, it is preferable to store, for example, a new table part which associates the device information name indicating the new device information with the corresponding location information in the second storage unit in replace of an original table part. In other words, the table part stored in the second storage unit is rewritten. Accordingly, when the command for the device information which is newly acquired or set is inputted, the controlling unit may acquire the location information of the new device information and access the device information of the requested object according to the location information based on the new table part by executing the analyzing program part.

The analyzing program part determines whether the device information name corresponding to the device information of a requested object is included in the table part. The command processing program includes an executing program part for processing contents of the command corresponding to the device information based on the location information which is associated with the device information name corresponding to the device information of the requested object. The controlling unit executes the executing program corresponding to the device information of the requested object when the device information name corresponding to the device information of the requested object is included in the table part by executing the analyzing program part.

In other words, the command processing program includes an executing program part as well as the analyzing program part and the table part. The controlling unit, when acquiring the location information of the device information of the requested object based on the analyzing program part, executes a process according to contents of the command corresponding to the device information based on the executing program part.

The requested command may be certainly processed by the controlling unit executes the analyzing program part and the executing program part.

When the command processing program includes the executing program part, the executing program part may be stored in the first storage unit.

Accordingly, the area occupied by the command processing program can be reduced in the second storage unit capable of being rewritten, and other programs can effectively use the second storage unit.

On the contrary, when the command processing program includes the executing program part, the executing program part executes a predetermined process corresponding to the predetermined device information in addition to a process corresponding to the contents of the command when the device information of the requested object is preliminary predetermined device information. At least one part among the executing program parts for executing the predetermined process is stored in the second storage unit.

Accordingly to the information processing apparatus constructed as above-described, as the analyzing program part is stored in the first storage unit, other program programs can effectively use the second storage unit. The contents of the special process can correspond to the flexibility (adding, changing, deleting, and so on). Accordingly, the information processing apparatus, which can effectively use the second storage unit and correspond to the flexibility for changing the program, can be supplied When the part for executing the special process is stored in the second storage unit, the other parts (besides the part for executing the special process of the executing program unit), are stored in the first storage unit.

Accordingly, because the other parts besides the part for executing the special process on the analyzing program part and the executing program unit in the command processing program are stored in the first storage unit, the second storage unit can be effectively used.

The information processing unit includes a device information storing unit for storing the device information. The location information, which is associated with the device information name in the table part, indicates the location of the device information in the device information storing unit. Also, the controlling unit executes the process corresponding to the contents of the command by accessing the device information storing unit according to the command processing program based on the location information associated with the table part.

According to the information processing apparatus, the controlling unit can certainly access the device information stored in the device information storing unit based on the location information of the table part by executing the command processing program, and can certainly acquire and set the predetermined (object requested by the command) device information.

However, it may be considered that the controlling unit may need to acquire and set the other device information according to a case as well as the device information corresponding to the device information name included in the table part from the beginning.

In this case, a corresponding information adding unit creates an additional table which associates the device information name for indicating the device information of the additional instruction object with the location information for indicating the location of the device information according to an additional instruction for newly adding the device information capable of corresponding to a request by the command.

In other words, when newly adding the device information capable of corresponding to a request of the command, the corresponding information adding unit creates the additional table. When the command corresponding to the newly added device information is inputted, the location information of the requested device information can be acquired based on the additional table and the requested device information can be accessed by the controlling unit executes the analyzing program part.

According to the information processing apparatus, in the case that the device information to be acquired or set (or needed to be acquired or set) exists, the device information can be easily acquired or set by associating the device information name indicating the corresponding device information with the location information and the registering the corresponding device information name in the additional table.

The information processing apparatus includes a device information storage unit. The location information, which is associated with the device information name in the table part and the additional table, indicates the location of the device information in the device information storing unit. The controlling unit executes the process corresponding to the contents of the command by accessing the device information storing unit according to the command processing program based on the location information associated with the table part and an additional table part.

According to the information processing apparatus, the controlling unit can certainly access the device information stored in the device information storing unit based on the location information of the table part and the additional table part by executing the command processing program, and can certainly acquire or set the predetermined device information.

In the case that the information processing apparatus includes the corresponding information adding unit, the information processing apparatus also includes an additional table storing unit for storing the additional table. The additional table is created by storing the additional table in the additional table storing unit according to the corresponding information adding unit.

The corresponding device adding unit can certainly create the additional table by storing the additional table in the additional table storing unit. The created additional table is certainly maintained by the additional table storing unit.

In the case that the information processing apparatus includes the corresponding information adding unit, the additional instruction includes the device information name and the location information corresponding to the device information to be added. The corresponding information adding unit creates the additional table based on the device information and the location information included in the additional instruction.

According to the information processing apparatus, the additional table can be easily created by associating the device information name transmitted as the additional instruction with the location information.

The corresponding information adding unit, for example, can be implemented by a plurality of methods such as specific hardware. The information processing apparatus also includes a corresponding information adding program for using a computer as the corresponding information adding unit. The computer functions as the corresponding information adding unit executing the corresponding information adding program by the controlling unit.

In the information processing apparatus implementing the corresponding information adding unit by the controlling unit executes the corresponding information adding program, the corresponding information adding program is included in the command processing program and stored in the first storage unit.

The new device information capable of being acquired or set can be easily added without pressing the free space of the second storage unit by storing the corresponding information adding program in the first storage unit.

In the information processing apparatus, the corresponding information processing apparatus is capable of transmitting and receiving data between external devices and receives the command from the external devices.

According to the information processing apparatus, external equipment can acquire the device information related to the information processing apparatus, and the device information of the information processing apparatus can be set by transmitting the command from the external equipment.

In the information processing apparatus including the corresponding information adding unit, the corresponding information processing apparatus is capable of transmitting and receiving data between external devices and receives the command or the additional instruction from the external devices.

According to the information processing apparatus, the external equipment can acquire or set the device information. Additionally, the device information capable of being acquired or set of can be newly added by an instruction (additional instruction) from the external equipment.

However, as the information processing apparatus, various devices are conceivable such as a device having copy function, a device having an image scanner function, or a device having a facsimile function. The information processing apparatus also includes an image forming unit for forming an image in a recording medium based on print data being inputted. The information processing apparatus also includes the device information capable of corresponding to the request by the command includes information corresponding to an operation of the image forming unit.

According to the information processing apparatus, each information related to the operation of the image forming unit can be acquired or set, and the functions according to the image forming unit can be effectively used. While various devices can be conceivable as a detailed example of the first storage unit and the second storage unit, the first storage unit may be a mask ROM and the second storage unit may be a flash ROM.

Accordingly, the part stored in the mask ROM among the command processing programs can be certainly stored regardless of the power source. The stored contents of the part stored in the flash ROM among the command processing programs can be remained or rewritten according to the necessary regardless of the power source. Additionally, the flash ROM has high capacity and low price comparing to other rewritable ROMs so that the cost at the information processing apparatus can be down.

The corresponding information adding program makes a computer function as the corresponding information adding unit in the information processing apparatus.

The corresponding information adding program for executing the data as the corresponding information adding unit may be used, for example, in a ROM or a backup RAM by storing the ROM or the backup RAM in a computer. In addition, the corresponding information adding program may be used for recording in, for example, a floppy (registered trademark) disk, a magneto-optical disc, a CD-ROM, or a hard disk, which can be read or written in the computer, and loading and deriving in the computer according to the necessary.

BRIEF DESCRIPTION OF THE DRAWINGS

Illustrative aspects of the invention may be more readily described with reference to the accompanying drawings:

FIG. 2 is a view illustrating a storing state of a program data related to the PJL of a memory in a first embodiment according to the present invention;

FIGS. 5A to 5C are views illustrating detailed examples of a PJL command from a host and data which a multi-function machine responds corresponding to the PJL command;

FIG. 6 is a flowchart illustrating a PJL receiving process of a first embodiment according to the present invention;

FIG. 7 is a view illustrating a storing state of a program data related to the PJL of each memory in a second embodiment according to the present invention;

DETAILED DESCRIPTION

Hereinafter, embodiments of the present invention will be described with reference to accompanying drawings.

First Embodiment

Figure 1:
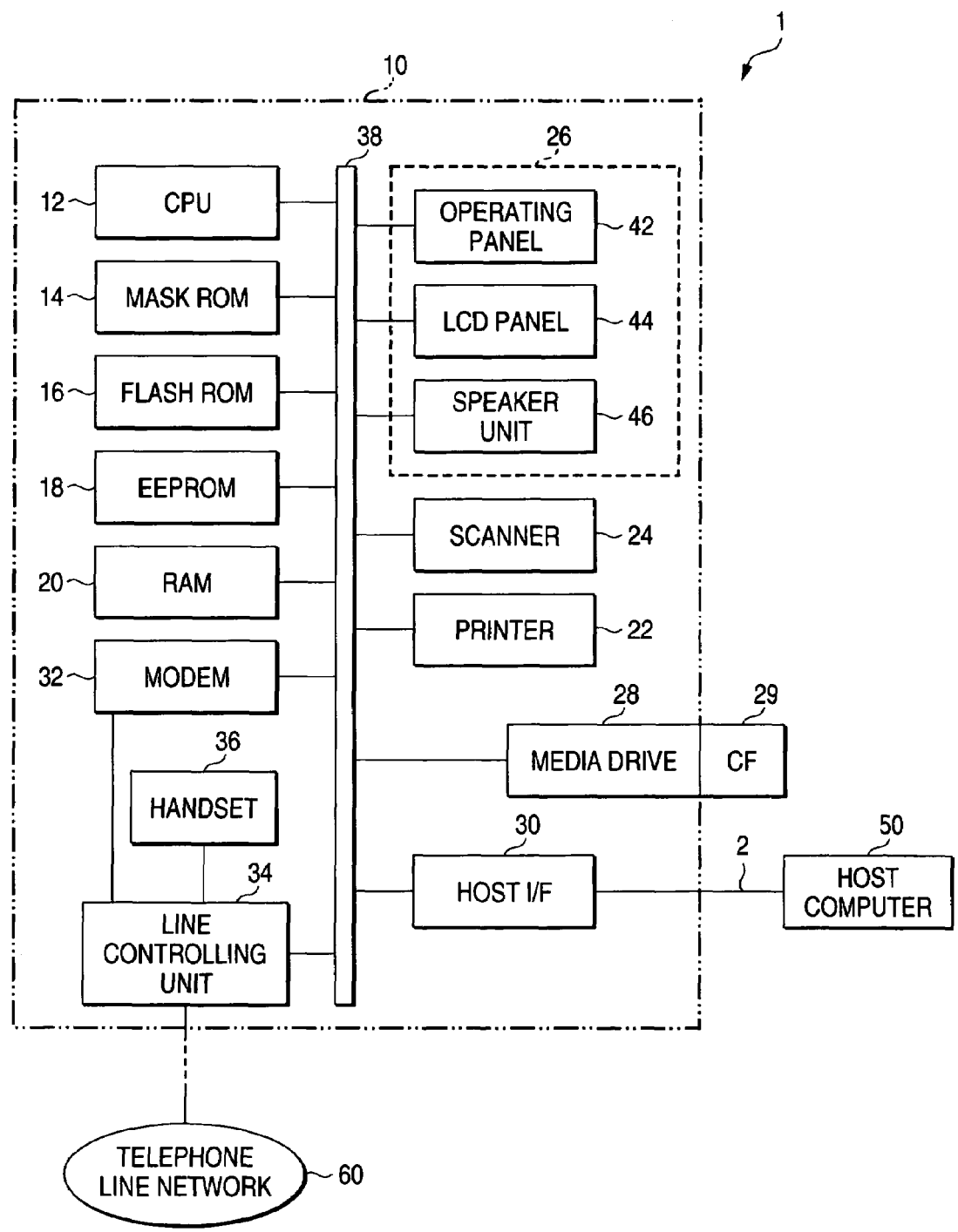
FIG. 1 is a block diagram illustrating an overview configuration of a printing system of one embodiment according to the present invention.

FIG. 1 is a block diagram illustrating a simple overview of a printing system 1 according to an embodiment of the present invention. As shown in FIG. 1, in the printing system 1 according to one embodiment of the invention, a multi-function machine 10 is coupled to a host computer 50 (hereinafter, refer to host) so as to transmit or receive data through a communication cable 2.

The multi-function machine 10 corresponding to the information processing apparatus according to one embodiment of the present invention has a function as a telephone for voice communication through a telephone line network 60, a function as a facsimile for transmitting and receiving an image through the telephone line network 60, a function as a scanner for reading the image on a paper as image data, and a printer function for printing the image displayed by the image data on the paper.

The multi-function machine 10 is connected to a CPU 12, a mask ROM 14, a flash ROM 16, an EEPROM 18, a RAM 20, a printer unit 22, a scanner unit 24, a user interface 26, a media drive 28, a host interface 30, a modem 32, and a line controlling unit 34 through a bus 38. Additionally, the line controlling unit 34 is connected to a handset 36.

The CPU 12 corresponding to a controlling unit according to one embodiment of the present invention controls operations of the multi-function machine 10 by transmitting an instruction to each element of the multi-function machine 10 through the bus 38 while storing process results in the RAM 20 according to each program data stored in the mask ROM 14 or the flash ROM 16.

The mask ROM 14 is a well-known ROM which can not rewrite the stored contents, stores a boot program for deriving the corresponding multi-function machine 10 as well as a command option recognizing program which will be described later, and stores font data used in the printer function.

The flash ROM 16 is a well-known ROM which can rewrite the stored contents, stores a program for analyzing the printing data received from the host 50 as well as an after-described option dictionary, and stores each program or data for performing above-described functions.

The EEPROM 18 is also a well-known non-volatile memory which can rewrite stored contents, stores desired controlling parameters while the CPU 12 performs various processes, and stores information such as telephone numbers, facsimile numbers, and soon inputted by a user. Additionally, the EEPROM 18 stores an operation state of the corresponding multi-function machine 10 or information including each setting contents (as will hereinafter be described, option value), responds to the host 50 corresponding information according to a request of the host 50, or changes the setting contents according to the request of the host 50 as will hereinafter be described.

The RAM 20 is a well-known volatile memory capable of holding the stored contents when the power is supplied. The RAM 20 is used as a work area while the CPU 12 performs each process, and the option value stored in the EEPROM 18 when deriving the corresponding multi-function machine 10 is copied in the RAM 20. During the multi-function machine 10 operates, basically, the multi-function machine 10 operates according to the copied option value in the RAM 20.

The printer unit 22 corresponds to the image forming apparatus according to one embodiment of the present invention, receives an instruction from the CPU 12, and prints the image on the paper set in a paper feeding unit which is not shown in drawings (that is, forming the image on a hidden recording medium).

The scanner unit 24 receives the instruction from the CPU 12 and creates image data of read image while reading the image on the paper set in a reading unit which is not shown in the drawings.

Additionally, the multi-function machine 10 further includes a copy function that prints the image read from the scanner unit 24 in the printer unit 22.

The user interface 26 includes an operating panel 42 which includes a plurality of buttons capable of inputting characters, numbers, or symbols, a displaying panel (LCD panel) 44 for displaying each information by receiving the instruction from the CPU 12, and a speaker unit 46 which includes a speaker and a deriving circuit for deriving the speaker.

The host interface 30 is an interface for connecting the corresponding multi-function machine 10 to other computer system through a communication cable. In one embodiment according to the present invention, the multi-function machine 10 is connected to the host 50 through the communication cable 2.

The modem 32 receives the instruction from the CPU 12, while creating an image signal capable of transmitting through the telephone line network 60 after modulating the image data created in the scanner unit 24, controls the image signal inputted through the line controlling unit 34 from the telephone line network 60, and creates the image data. Additionally the handset 36 is a transceiver which is used by detaching from the multi-function machine 10.

The line controlling unit 34 receives the instruction from the CPU 12 while inputting each signal from the telephone line network 60 and outputting the signal to the telephone line network 60, and sets a transmitting path which may be a transmitting destination or a transmitting source of the inputting or outputting signals between the telephone line network 60 and the line controlling unit 34.

The media drive 28, which is capable of detaching or attaching each memory card 29, registers or reads the data into or from the attached memory card 29. Additionally, the 'memory card' maybe, for example, a compact flash (registered trademark. Hereinafter, abbreviate as 'CF'), a smart media (registered trademark), a memory stick (registered trademark), a multimedia card, an SD memory card, and so on.

The host 50 corresponds to external equipment according to one embodiment of the present invention, even omitted in the drawings, and is a well-known computer system which includes the CPU, the ROM, the RAM, hard disk, a keyboard, a mouse, a display, and so on. The hard disk included in the host 50 includes a scanner program for using the scanner function on the multi-function machine 10 and a printer driver for using the printer function as well as each application. And, the hard disk also includes a program for creating the PJL command which will be described later, and transmitting the created PJL command to the multi-function machine 10. The host 50 can request to acquire or set the information (above-described option value) on the multi-function machine 10 by transmitting the PJL command to the multi-function machine 10.

The multi-function machine 10 of one embodiment according to the present invention corresponds to the printer job language (PJL) and stores the PJL program for interpreting and processing the received PJL command from the host 50 according to the PJL command (acquiring or setting the requested information) in the mask ROM 14 and the flash ROM 16 after being separated. FIG. 2 shows a state of stored program data corresponding to the PJL process on the mask ROM 14, the flash ROM 16, the EEPROM 18, and RAM 20.

As shown in FIG. 2, in one embodiment according to the present invention, the PJL processing program 70 for corresponding to the PJL command received from the host 50 includes a command option recognizing program 72, an option executing program 74, and an option dictionary 76. The command option recognizing program 72 and the option executing program 74 are stored in the mask ROM 14, and the option dictionary 76 is stored in the flash ROM. The PJL processing program 70 is stored separately in the mask ROM 14 and the flash ROM 16.

The command option recognizing program 72 recognizes the PJL command from the host 50, analyzes the request, and determines the desired process. The command option recognizing program 72 is for performing a process for determining whether the information of an object requested by the PJL command is included in the option dictionary 76 and a process for acquiring the location information from the EEPROM 18 based on the option dictionary 76 when the information of the object requested by the PJL command is included in the option dictionary 76.

Figures 3A, 3B:
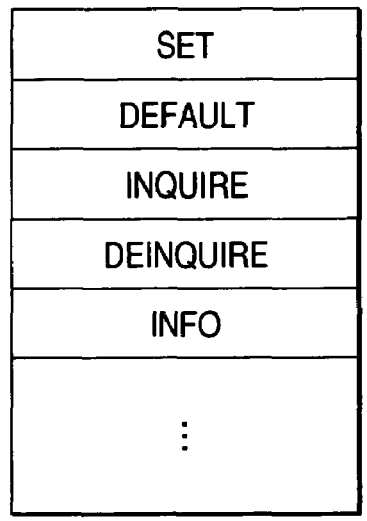
FIG. 3A is a command list displaying a kind of the command.
FIG. 3B is a view illustrating contents of an option dictionary stored in a flash ROM.

The command capable of being recognized by the multi-function machine 10 in one embodiment according to the present invention is stored in the mask ROM 14 as a command list as shown in FIG. 3A. The detail of each command will be explained later.

In the PJL processing program 70, the option dictionary 76 is a table including the information name indicating the kind of the information capable of corresponding to the request by the PJL command. The information name is associated with the location information indicating the location of the corresponding information. The information name and a scope of the value of the corresponding information (option) also may be included in the option dictionary 76.

In particular, as shown in FIG. 3B, the option name as the information name is associated with an ID of the EEPROM 18 (EEPROM_ID) and stored in the list. For example, in the copy function, the option name "COPIES" which indicates the number of the copy paper is associated with an NV_COPIES_ID which is the EEPROM_ID storing the set value of the copy paper which is the real set value of the option (option value). For example, in the printer function, an option name "PAPER" indicating a size of the printing paper is associated with NV_PAPER_ID which is the EEPROM_ID storing the set value of the size of the printing paper which is the option value of the option name "PAPER". Additionally, even omitted in drawings, the EEPROM_ID also includes a block number (address) storing the corresponding information in the EEPROM 18, respectively.

Among the option names shown in FIG. 3B, "LANG" is the information for replacing the language being supported by the printer function on the corresponding multi-function machine 10. "XOFFSET" is information for adjusting a printing location (here, location for starting to print forward to X side) "TIMEOUT" is information corresponding to the timeout value in the case when the data is not inputted during a predetermined period into the host interface 30 from the host side. Any one of above elements is associated with the EEPROM_ID ("NV_'option name'_ID").

Except for the option name shown in FIG. 3B, for example, the option name, which will be explained in FIGS. 5A to 5C, such as "TOTALPAGE", "RESOLUTION", and "MEDIATYPE" are also included in the option dictionary 76.

In the PJL processing program 70, the option executing program 74, based on the contents (EEPROM_ID, address, and so on) included in the option dictionary 76 corresponding to the information, is a program for accessing the information and executing the corresponding process according to the acquiring command or the set command per information requested by the PJL command.

Figure 4:
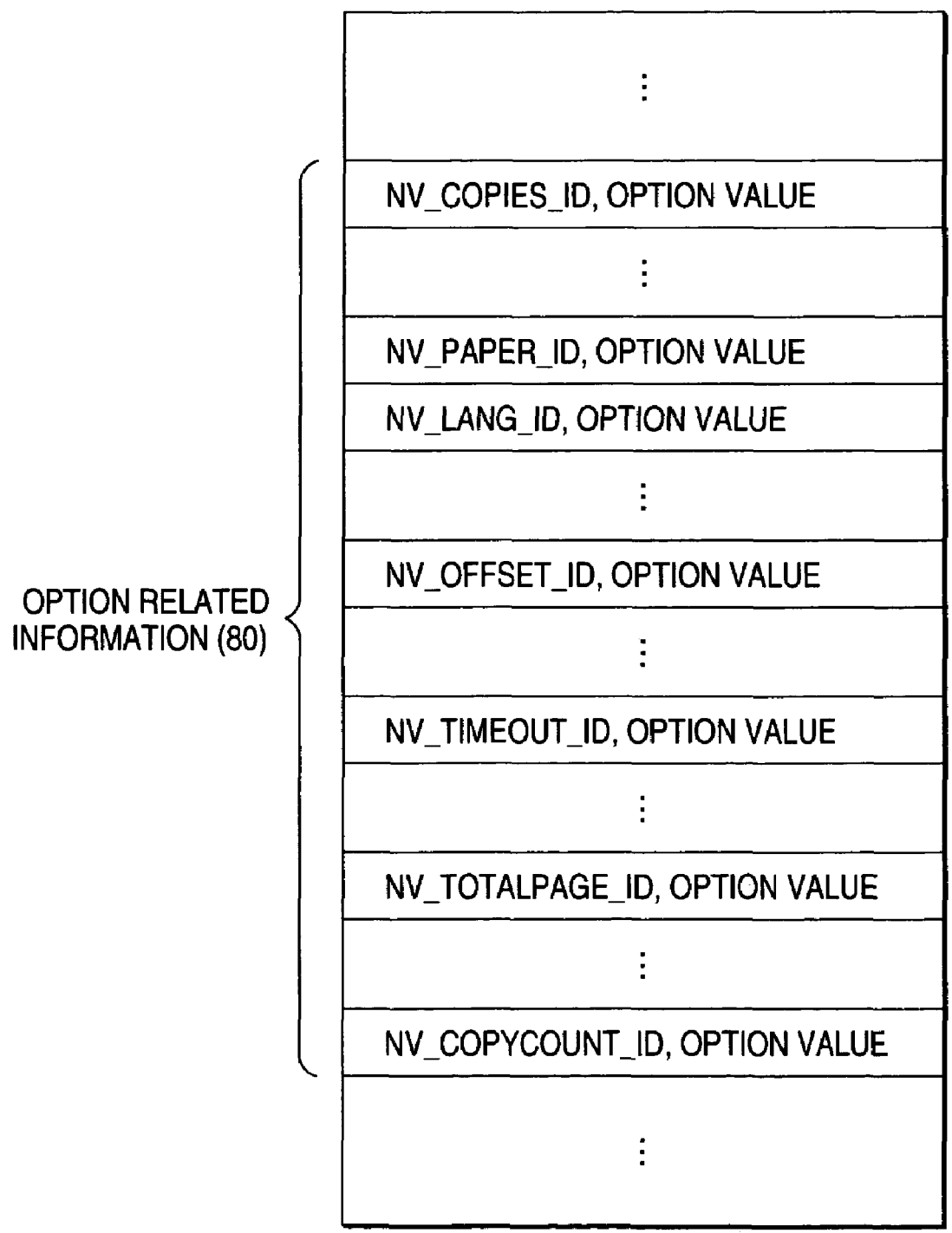
FIG. 4 is a view illustrating option related information stored in a managing area of an EEPROM.

In EEPROM 18, the information (option value) indicating the operation state or set contents of the corresponding multi-function machine 10 is stored as option related information 80. In particular, as shown in FIG. 4, in a predetermined area on the managing area of the EEPROM 18, the option value indicating the operational state of the corresponding multi-function machine 10 or the each set contents is stored in the predetermined address with the EEPROM_ID. The option related information 80 is copied in the RAM 20 when deriving the corresponding multi-function machine 10, and a default value is the option related information 80 in the EEPROM 18 so that the operation of the multi-function machine 10 is executed based on the option related information 81 of the RAM 20.

Figure 5B:
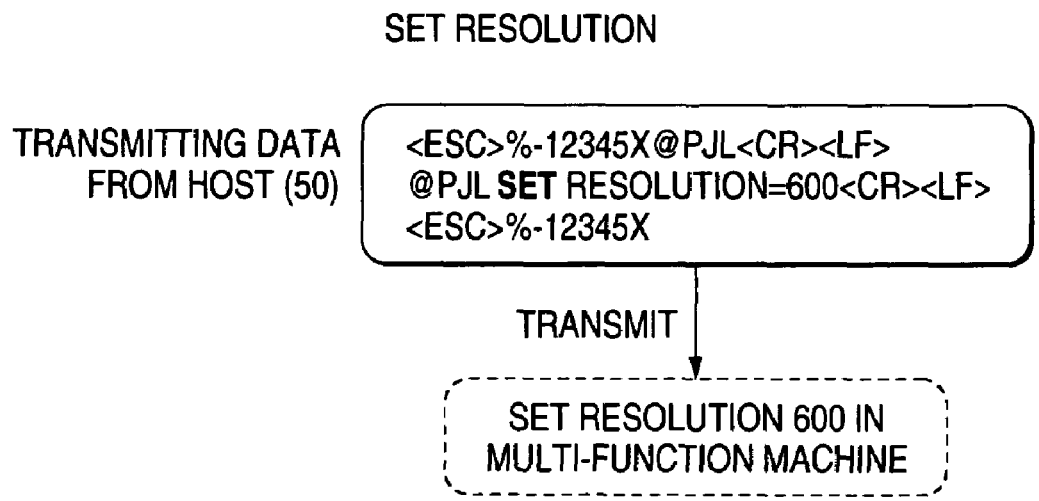
Figure 5C:
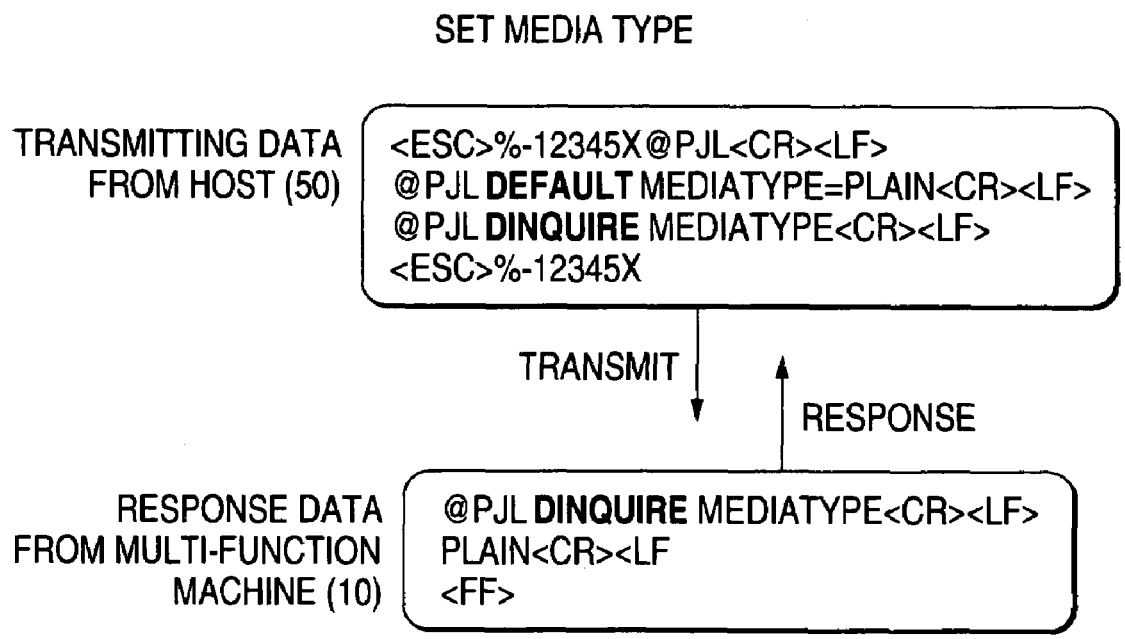

FIGS. 5A to 5C show a particular example (example of the character) of the PJL command received from the host 50 and the example of the data which is transmitted to the host 50 (or processed in the multi-function machine 10) from the multi-function machine 10 when the multi-function machine 10 receives the PJL command. The host 50, when creating the PJL command, creates the PJL command by a format as "@PJL 'command name' 'option name' (optional value)".

At first, FIG. 5A shows an example of data that the host 50 transmits to the multi-function machine 10 in order to acquire a page counter in the multi-function machine 10 and data that the multi-function machine 10 responds to the received data from the host 50. In the data transmitted from the host 50, the multi-function machine 10 recognizes that the PJL command is received by UEL (Universal Exit Language) represented as "<ESC>%-12345X" in the first row, and accordingly, the multi-function machine 10 becomes a state (PJL command mode) capable of processing the PJL command. The example of the characters on the second and the third rows are the PJL commands. The command "DINQUIRE" on the second row of the PJL command is for acquiring the data, that is, option value stored in the EEPROM 18, set as the default in the multi-function machine 10. The option name "TOTALPAGE" indicates a page counter which is the information of the requested object.

The command "INQUIRE" on the third row of the PJL command is the data set as a current job, but not as the default, that is, the command "INQUIRE" is a command for acquiring the information (variable) stored in the RAM 20.

When both the page counter value stored in the EEPROM 18 and the page counter value stored in the ROM 20 are, for example, '500', if the PJL command is transmitted to the multi-function machine 10, the multi-function machine 10 recognizes the option name "TOTALPAGE" while recognizing the command in the PJL command, and searches the dictionary table 76 to determine if the option name is included in the dictionary table 76. If the dictionary table 76 includes the option name, the page counter value in the EEPROM 18 is accessed by using the EEPROM_ID (in this example, NV_TOTALPAGE_ID) associated with the option name. However, the command "INQUIRE" does not access the EEPROM 18 but accesses the counter page counter value stored in the RAM 20. The details for accessing the RAM 20 is omitted.

If the requested data is acquired, the data is read-back from the multi-function machine 10, and response data shown in FIG. 5A are transmitted to the host 50. Among the @PJL DINQUIRE TOTALPAGE<CR><LF>500<CR><LF> of the first and the second rows on the response data, the front part is the transmitted PJL command and the rear part "500" following to the "<CR><LF>" is the option value (in this case, page counter) managed by the EEPROM 18 in the multi-function machine 10 corresponding to the "TOTALPAGE".

According to the character string "@PJL INQUIRE TOTALPAGE<CR><LF>500<CR><LF>" in the third to fourth rows of the response data, the front part is the transmitted PJL command and the rear part "500" following to the "<CR><LF>" is the page counter value stored in the RAM 20 inside of the multi-function machine 10 corresponding to the "TOTALPAGE".

The host side can acquire the fact that the page counter on the multi-function machine 10 is '500' by receiving the response data. The ULE represented as "<ESC>%-12345X" of the last row in the transmitting data from the host 50 side indicates the termination of the PJL command. When receiving the ULE, the PJL command mode is released in the multi-function machine 10 side.

When the page counter value stored in the EEPROM 18 and the page counter value stored in the ROM 20 are different from each other, the corresponding page counter value is responded from the multi-function machine 10 as the response data, respectively.

FIG. 5B shows the data transmitted to the multi-function machine 10 in order to change the set of resolution and process contents of the multi-function machine 10 side corresponding to the transmitted data. A command set of the PJL command on the second row of the transmitted data from the host 50 is not the data (that is, stored in the EEPROM 18) set as the default in the multi-function machine 10 side but as the data set corresponding to the current job, that is, the command for setting information stored in the RAM 20. The numerical value "600" in the rear part of the PJL command indicates detailed resolution.

If the transmitted data (PJL command) is transmitted to the multi-function machine 10, in the multi-function machine 10, while the command in the PJL command is recognized, also the option name "RESOLUTION" is recognized and searched if the option name "RESOLUTION" is included in the dictionary table 76. If the option name "RESOLUTION" is included in the dictionary table 76, a location storing the corresponding information (here, resolution) in the RAM 20 is accessed. The access detail is omitted. The resolution information, which corresponds to the current job and set in the RAM 20, is changed to "600". As like this, "SET" is different from the command "DEFAULT" which will be described later and the "SET" is not for changing the option value (here, resolution) which is set as default on the EEPROM 18.

FIG. 5C shows an example of the data that the host 50 side transmits to the multi-function machine 10 in order to change the set of the paper type on the multi-function machine 10 and response data from the multi-function machine 10 corresponding to the transmitted data. In the character string "@PJL DEFAULT MEDIATYPE=PLAIN<CR><LF>" in the second row of the transmitted data from the host 50, the command "DEFAULT" is the command for setting the option value which is set as the default (that is, stored in the EEPROM 18) in the multi-function machine 10 side. The character string "PLAIN" in the rear part of the PJL command indicates the detailed type name of the paper.

The command "DINQUIRE" on the third row PJL command, as described above, is data set as the default in the multi-function machine 10, that is, the command "DINQUIRE" is for acquiring the option value stored in the EEPROM 18. This transmitting data requests to respond the default value of the paper type after chaining the set while requesting the set (change) of the paper type corresponding to the multi-function machine 10.

If the transmitting data (PJL command) is transmitted to the multi-function machine 10, in the multi-function machine 10, the option value corresponding to the paper type stored in the EEPROM 18 is changed and set to "PLAIN", and the response data indicating that the default is set as "PLAIN" is transmitted to the host 50 side as shown in FIG. 5C.

In one embodiment according to the present invention, when adding the information (option) capable of corresponding to the PJL command, the option dictionary 76 is modified. In particular, for example, when acquiring the information corresponding to the copy counter in the copy function, a new option dictionary is created. In the new option dictionary, the option name "COPYCOUNT" representing the copy counter is associated with the EEPROM_ID and the address in the EEPROM storing the copy counter. It is preferable to rewrite the option dictionary 76 in the flash ROM 16 into the newly created option dictionary. In the PJL processing program 70, the program stored in the mask ROM 14 does not have to be changed. And, the new option is added by newly creating the program (option dictionary) and rewriting only the contents (option dictionary 76) of the flash ROM 16.

Accordingly, in one embodiment according to the present invention, as in conventional way, the entire PJL processing program 70 is not stored in the flash ROM 16. The command option recognizing program 72 and the option executing program 74, which are general parts of the program having little possibility to be changed, are stored in the mask ROM 14. The option dictionary 76, which is a part of the program having possibility to be changed, is stored in the flash ROM 16.

Next, a PJL receiving process executed in the multi-function machine 10 when the multi-function machine 10 receives the PJL command from the host 50 side, will be explained based on FIG. 6. FIG. 6 is a flowchart illustrating the PJL receiving process executed in the CPU 12. In the multi-function machine 10, the CPU 12 reads the PJL processing program 70 from the mask ROM 14 and the flash ROM 16, and executes the PJL receiving process according to the read PJL processing program.

After the PJL receiving process is started, the PJL command is received (S110), a desired process corresponding to the information is recognized per the received PJL command according to the command option recognizing program 72 stored in the mask ROM 14 among the PJL processing program 70 (S120), and it is determined whether the contents of the command is for setting the information (data) in the multi-function machine 10 or for acquiring the information in the multi-function machine 10 (S130).

In the case of, for example, command for setting the information such as "SET" or "DEFAULT", the process proceeds to s140 and it is determined whether the requested option, that is, the option name included in the PJL command is included in the option dictionary 76 or not included. If the option name is not included in the option dictionary 76, the process terminated. If the option name is included in the option dictionary 76, the option value included in the PJL command is written into the EEPROM 18 using the EEPROM_ID which is associated with the option name according to the option executing program 74 stored in the mask ROM 14 among the PJL processing program (s150). As described above, when the command "DEFAULT" is written in the EEPROM 18 and the "SET" is written in the RAM 20.

Meanwhile, if the contents of the command, for example, is "INQUIRE" or "DINQUIRE" which acquires the information, the process proceeds from S130 to S160, it is determined whether the option name included in the PJL command is included in the option dictionary 76 or not. At this time, if the option name is not included in the option dictionary 76, the process terminates. If the option name is included in the option dictionary 76, the requested object information (option value) is read from the EEPROM 18 using the EEPROM_ID which is associated with the option name according to the option executing program 74 (s170). And, the read option value responds to the host 50 side (S180). In the case of the command "DINQUIRE", the information is read from the EEPROM 18 and in the case of command "INQUIRE", the information stored in the RAM 20 is read.

According to the multi-function machine 10 of one embodiment according to the present invention, as in conventional way, the entire PJL processing program 70 is not stored in the flash ROM 16. The command option recognizing program 72 and the option executing program 74, which are general parts of the program having little possibility to be changed, are stored in the mask ROM 14. The area occupied by the PJL processing program 70 on the flash ROM 16 is reduced such that the flash ROM 16 can be shared by the other program and so on.

Here, the corresponding relation between the elements of one embodiment according to the present invention and the elements of the present invention. The PJL processing program 70 of the embodiment according to the present invention corresponds to the command processing program of the present invention. The command option recognizing program 72 of the embodiment according to the present invention corresponds to the analyzing program part of the present invention. The option executing program 74 of the embodiment according to the present invention corresponds to the executing program part of the present invention. The option dictionary 76 of the embodiment according to the present invention corresponds to the table part of the present invention. The EEPROM 18 of the embodiment according to the present invention corresponds to the device information storing unit of the present invention. The option of the embodiment according to the present invention corresponds to the device information of the present invention. The option name of the embodiment according to the present invention corresponds to the device information name of the present invention. The EEPROM_ID of the embodiment according to the present invention corresponds to the predetermined information of the present invention.

In the PJL receiving process in FIG. 6, processes in steps S120, S130, S140, and S160 processed by the command option recognizing program 72 and corresponds to the process executed by the analyzing program according to the present invention. The processes in step S150, S170, and S180 are processed by the option executing program 74 and correspond to the process executed by the executing program according to the present invention.

Second Embodiment

In the first embodiment according to the present invention, when newly adding the information (option) capable of being read or acquired by the PJL command, the program is needed to be created (create a new option dictionary) case-by-case and rewritten in the option dictionary 76 in the flash ROM 16. In the embodiment according to the present invention, it may be possible to newly add the information which can be acquired or set without rewriting the option dictionary 76 in the flash ROM 16.

In particular, a command "ADDPJL" is prepared as a command for adding the information capable of being acquired or set. In the case of adding the information, the PJL command referred as "@PJL ADDPJL 'newly being added information (option name}''EEPROM_ID'" is transmitted to the multi-function machine 10 from the host 50 side. The host 50 side, which received the PJL command, recognizes that the option is to be added to the command by the command name "ADDPJL" in the PJL command.

As the result, according to the character string after the "ADDPJL", a dictionary, which associates the option name of related to an option to be newly added with the EEPROM_ID, is created. This dictionary, as shown in FIG. 7, is stored in the RAM 20 as a new registered option dictionary 89.

In order to implement this function, a PJL processing program 85 of one embodiment according to the present invention can recognize the command "ADDPJL" for adding the option and create a newly registered option dictionary 89 in the RAM 20 according to the request by the command "ADDPJL".

For example, in case of a state not capable of acquiring or setting the information related to the page counter on the copy function (that is, an option dictionary 88 does not include an corresponding option name) and in case of newly adding an option so that the information related to the page counter can be acquired or set, it is desired that the host 50 transmits a PJL command "@PJL ADDPJL COPYCOUNT NV_COPYCOUNT_ID".

In the multi-function machine 10 which received the PJL command, the PJL command is recognized whether the PJL command is for adding the new option. And the newly registered option dictionary 89 which associates the option name "COPYCOUNT" with the corresponding EEPROM_ID "NV_COPYCOUNT_ID" is stored in the RAM 20.

Meanwhile, the command "ADDPJL" for adding the option is recognized, an option adding program (corresponding information adding program of the present invention) which is a program for creating the newly registered option dictionary 89 in the RAM 20 according to the request of the command "ADDPJL" is stored in the mask ROM 14 after included as one part of the PJL processing program 85.

Additionally, the multi-function machine 10 in one embodiment according to the present invention adds a process corresponding to the PJL command per a part of the option registered in option dictionary 88 and executes a set process (hereinafter, special process) in advance. Related to the special process, the process contents may be changed or the special process may be executed over other options.

Therefore, in one embodiment according to the present invention, the special process may be changed according to the necessary by storing the option executing program 87 in the flash ROM 16. In the option which the special process is processed (hereinafter, refer to 'special process corresponding option'), the corresponding option name in the option dictionary 88 is associated with the information which indicates the purpose. That is, in the 'special process corresponding option, the option name is associated with the corresponding EEPROM_ID and the information which indicates the purpose corresponding to the special process corresponding option in the option dictionary 88.

For example, when the PJL command "@PJL DEFAULT MEDIATYPE=THICK" is transmitted to set the paper type at the host 50 side, if a process such as the option "MEDIATYPE" is the special process corresponding option, the special process corresponds to the printer unit 22, and a printing process is prepared according to the requested paper type "MEDIATYPE" is set to be executed, the received PJL command is rewritten in the EEPROM 18 using the EEPROM_ID corresponding to the option "MEDIATYPE" or as the special process, and the printer unit 22 is instructed to correspond to the print into the set paper type "THICK" (thickness of the paper).

Figure 8:
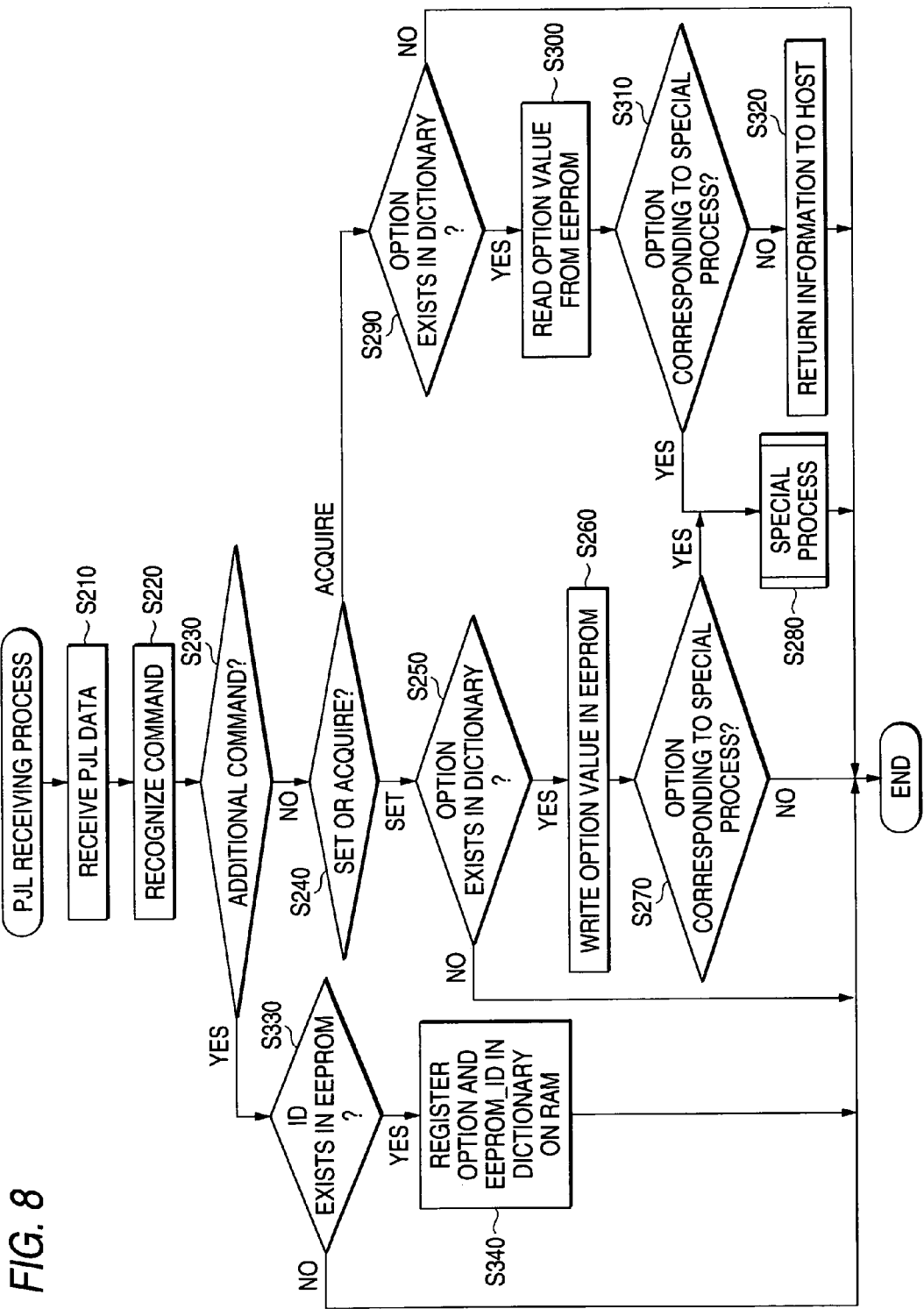
FIG. 8 is a flowchart illustrating a PJL receiving process of a second embodiment according to the present invention.

Next, the PJL receiving process of one embodiment according to the present invention will be explained based on FIG. 8. FIG. 8 is a flowchart showing the PJL receiving process executed in the CPU 12.

If the PJL receiving process is started and the PJL command is received (S210), the information and the corresponding process is recognized per the received PJL command according to the command option recognizing program 86 stored in the mask ROM 14 in the PJL processing program 85 (S220). According to the option adding program stored in the mask ROM 14 in the PJL processing program 85, it is determined whether the command is the "ADDPJL" for adding the option or not.

In case of "ADDPJL", the process proceeds to step S330. In case of a command except the "ADDPJL", the process proceeds to step S240 and it is determined whether contents of the command 86 is for setting the information (data) in the multi-function machine 10 or for acquiring the information in the multi-function machine 10.

For example, if the command sets information such as "SET" or "DEFAULT", the process proceeds to step S250, and it is determined whether the option included in the PJL command is included in the option dictionary 88 or the newly registered option dictionary 89. If the option is not included in the option dictionary 88 or the newly registered option dictionary 89, the process is terminated. Otherwise, the option value included in the PJL command is rewritten in the EEPROM 18 using EEPROM_ID which is associated with the corresponding option name according to the option executing program 87 stored in the flash ROM 16 in the PJL processing program 85 (S260). As described above, in case of "DEFAULT" the option value is rewritten in the EEPROM 18 and in case of "SET" the option value is rewritten in RAM 20.

If the option is included in the option dictionary 88 or the newly registered option dictionary 89, it is determined whether the option name is associated with the information indicating that the option is the special process corresponding option. In the case of not the special process corresponding option (S270: NO), the process is terminated. In the case of the special process corresponding option (S270: YES), corresponding special process is executed (S280).

On the contrary, if the contents of the command are, for example, "INQUIRE" or "DINQUIRE", for acquiring the information, the process proceeds from step S240 to S290 and it is determined whether the option name included in the PJL command is included in the option dictionary 88 or the newly registered option dictionary 89. If the option name included in the PJL command is not included in the option dictionary 88 or the newly registered option dictionary 89, the process is terminated. If the option name included in the PJL command is included in the option dictionary 88 or the newly registered option dictionary 89, information of the requested object (the option value) is read from the EEPROM 18 by using the EEPROM_ID which is associated with the option name according to the option executing program 87 (S300). As described above, in the case that the command is "DINQUIRE", the information is read from the EEPROM 18 and in the case that the command is "INQUIRE", the information stored in the RAM 20 is read.

If the option name included in the PJL command is included in the option dictionary 88 or the newly registered option dictionary 89, it is determined whether the option name is associated with the information indicating that the option is the special process corresponding option. In the case that the special process corresponding option is no (S310: NO), the process is terminated after responding the read option value in step S300 to the host 50 side (S320). In the case that the special process corresponding option is yes (S310: YES), corresponding special process is executed (S280).

If the received command is "ADDPJL" which is for adding the option (S230: YES), it is determined whether the EEPROM_ID corresponding to the option which is requested to be added is included in the EEPROM 18 according to the above-described option adding program (S330). If the EEPROM_ID is not include in the EEPROM 18 (S330: NO), the process is terminated. If the EEPROM_ID is include in the EEPROM 18 (S330: YES), the option name of the added object and the corresponding EEPROM_ID are registered in the newly registered option dictionary 89 on the RAM 20.

In the multi-function machine 10 in one embodiment according to the present invention, when acquiring or setting the information, it may be possible to easily add the information capable of being acquired or set because the option name indicating the information is registered in the newly registered option dictionary 89 after being associated with the EEPROM_ID which is the location information of the option name by the option adding program in the PJL processing program 85.

The option name to be added and the EEPROM_ID are transmitted with the command "ADDPJL". Accordingly, in the multi-function machine 10, it may be possible to easily register the option name in the newly registered option dictionary 89 because the option name included in the received PJL command is registered in the newly registered option dictionary 89 after being associated with the EEPROM_ID.

Additionally, because the option adding program which corresponds to the command "ADDPJL" is stored in the mask ROM 14, it may be possible to add the new information capable of being acquired or set without pressing the free space of the flash ROM 16.

Additionally, as the command option recognizing program 86 in the PJL processing program 85 is stored in the mask ROM 14, the flash ROM 16 is effectively used by other programs. Additionally, it is possible to correspond to the flexible for the contents of the special process (adding, changing, deleting, and so on) by storing the option executing program 87 in the flash ROM 16. Also, the multi-function machine 10 can effectively utilize the flash ROM 16 such that the flexibility of the option executing program may be supplied In one embodiment according to the present invention, the PJL command including the command "ADDPJL" corresponds to the additional instruction of the present invention, the newly registered option dictionary 89 corresponds to the additional table, the RAM 20 corresponds to the additional table storing unit, the special process corresponds to the predetermined process, and the information (option) corresponding to the special process corresponding option corresponds to the predetermined device information. In the PJL receiving process in FIG. 8, any one of the processes among the step S230, S330, and S340 corresponds to the process executed b the corresponding information adding unit of the present invention.

Third Embodiment

Figure 9:
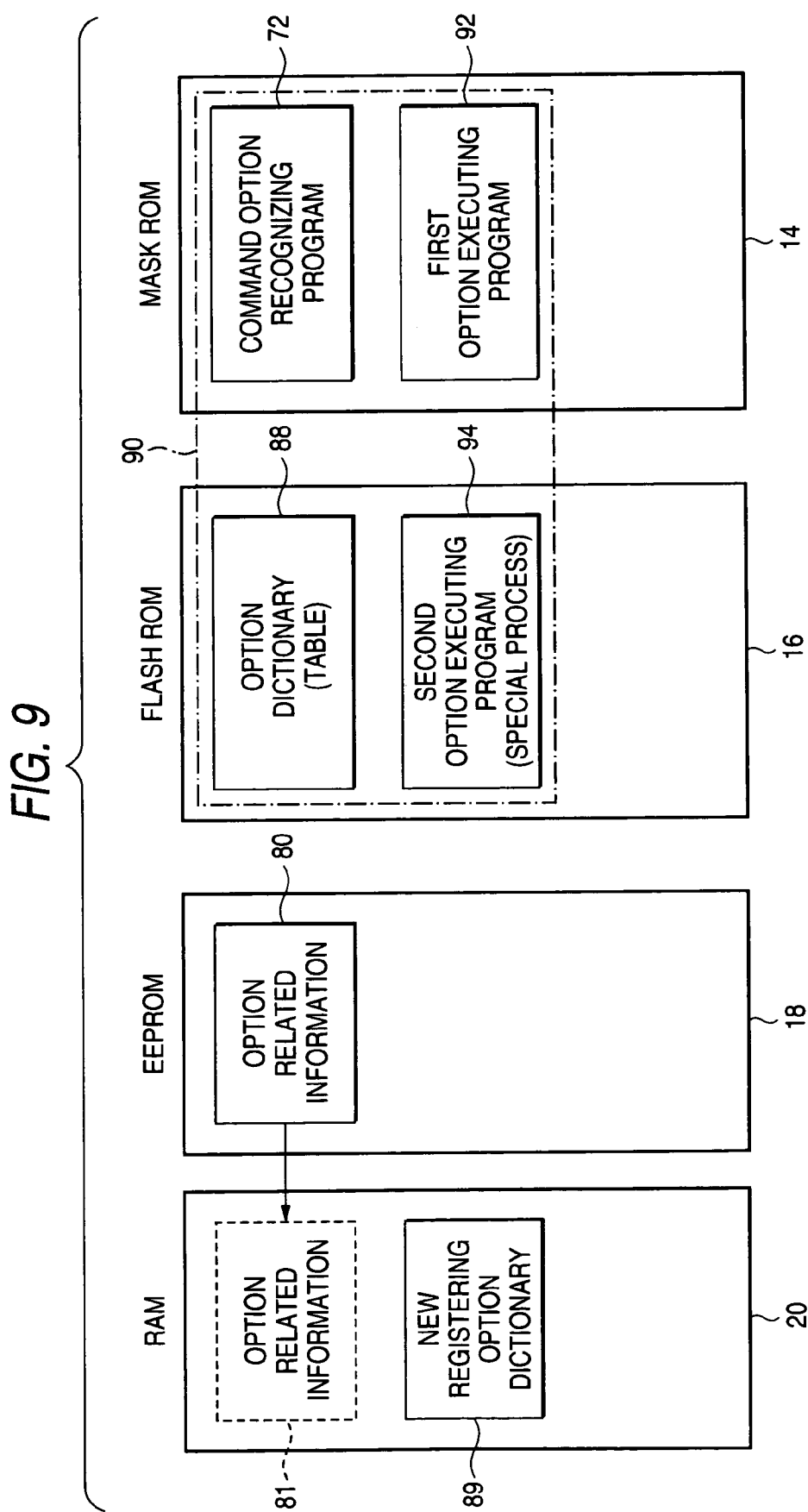
FIG. 9 is a view illustrating a storing state of a program data related to the PJL of each memory in a third embodiment according to the present invention.

Even in the second embodiment according to the present invention, an example that all of the option executing program 87 is stored in the flash ROM 16, but in this embodiment, as shown in FIG. 9, it is divided into the first option executing program 92 and the second option executing program 94. The first option executing program 92 is a part executing common processes (acquiring or setting the information) corresponding to the PJL command among the entire option executing program. The second option executing program 94 is a part executing the above-described special process. The first option executing program 92 is stored in the mask ROM 14 and the second option executing program 94 is stored in the flash ROM 16, respectively.

The PJL processing program 90 of one embodiment according to the present invention includes the command option recognizing program 72 stored in the mask ROM 14, the first option executing program 92, the option dictionary 88 stored in the flash ROM 16, and the second option executing program 94. In FIG. 9, the same reference numeral as those of FIG. 2 and FIG. 7 for the same elements will be used.

It may be possible to reduce the area occupied by the option executing program in the flash ROM 16 and may be possible to use the flash ROM 16 more efficiently by dividing the option executing program into the two and storing in the mask ROM 14 and the flash ROM 16, respectively.

In one embodiment according to the present invention, as same with the second embodiment, the information (option) capable of being acquired or set can be newly added by the command "ADDPJL". However, in this embodiment, the 'information (option) to be added' and the 'EEPROM_ID' are not added to the command "ADDPJL" as the second embodiment. It is desired to simply add the 'information (option) to be added' after the command "ADDPJL".

For example, in the case which is not possible to set the information (that is, corresponding option name is not included in the option dictionary 88) but it is desired to acquire or set the information related to the page counter in the copy function, it is preferable to transmit the PJL command "@PJL ADDPJL COPYCOUNT" from the host 50 side.

On the contrary, inside of the multi-function machine 10, the EEPROM_ID corresponding to the information set in the corresponding multi-function machine 10 is registered in advance as a view table, for example, in the mask ROM 14.

Therefore, in the multi-function machine 10 which received the PJL command, if it is recognized that the PJL command is a command for adding the new option, it is determined whether the EEPROM_ID including the option name "COPYCOUNT" exists in the view table. If the EEPROM_ID exists in the view table, the option name is associated with the corresponding EEPROM_ID and registered in the newly registered option dictionary 89.

According to above configuration, it may be possible to simply add the option because it is preferable to add the 'information name (option name) to be newly added' to the rear part of the command "ADDPJL" as the PJL command when newly adding the option capable of corresponding to the PJL command.

Figure 10:
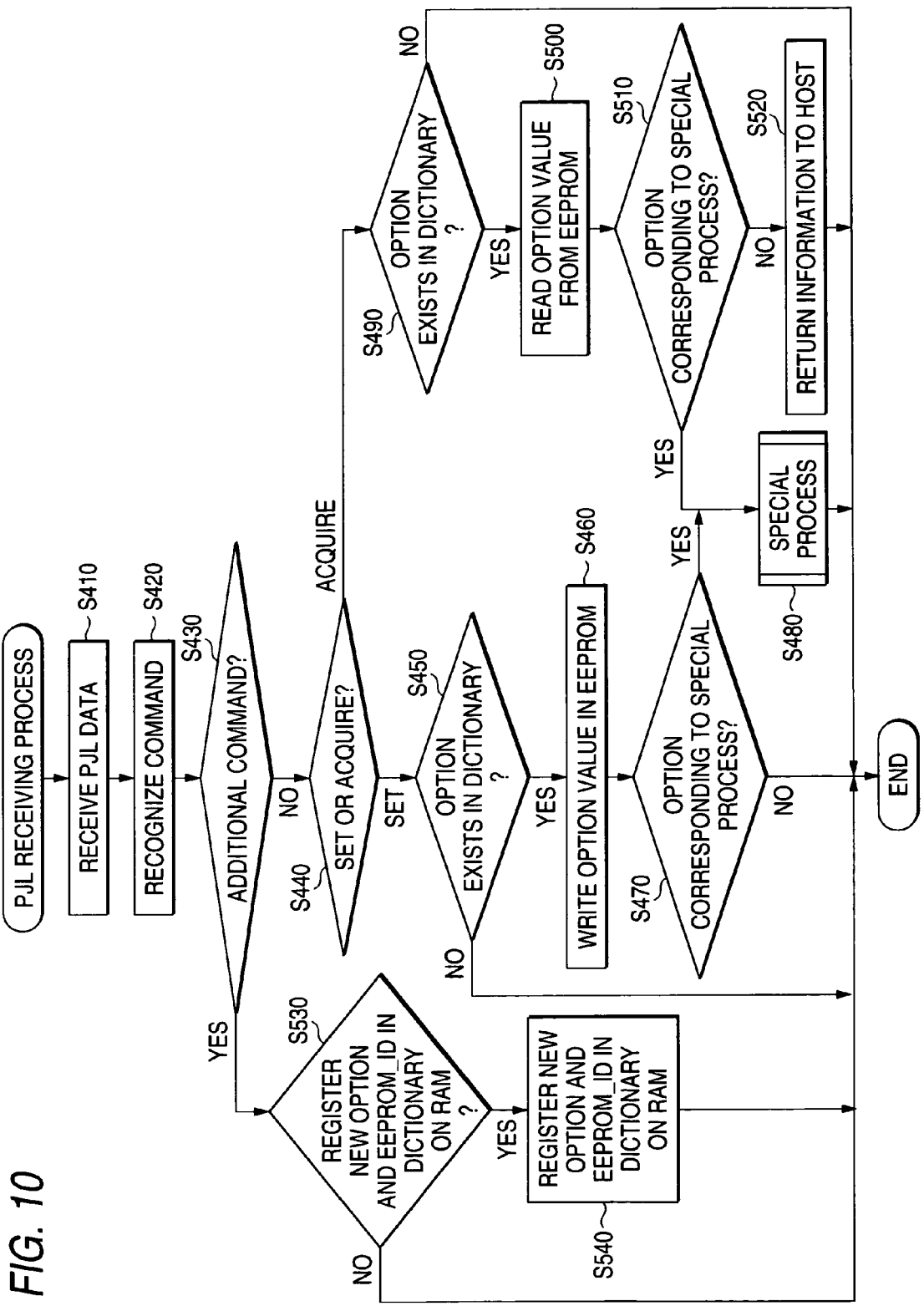
FIG. 10 is a flowchart illustrating a PJL receiving process of a third embodiment according to the present invention.

Next, the PJL receiving process in one embodiment according to the present invention will be explained based on FIG. 10. In the flowchart of FIG. 10, the process of steps S410 to S520 is identical with the PJL receiving process in S210 to S320 in the second embodiment shown in FIG. 8, the explanation for the process of step S410 to S520 will be omitted.

In one embodiment according to the present invention, if the received command is "ADDPJL" which is for adding the option according to the option adding program stored in the mash ROM 14 in the PJL processing program 90 (S430: YES), it is determined whether the option name requested to be add, that is, the command "ADDPJL" and the EEPROM_ID including the character strings of the option name are included in the above-described view table (S530). As the result, if the option name and the EEPROM_ID are not included in the view table, the process is terminated. If the option name and the EEPROM_ID are included in the view table, the option name of the added object and the corresponding EEPROM_ID are registered in the newly registered option dictionary 89 on the RAM 20.

In one embodiment according to the present invention, the first option executing program 92 corresponds to 'the other parts' among the executing programs of the present invention, the second option executing program 94 corresponds to 'the part for executing the special process' among the executing programs of the present invention (claim 5).

Modified Embodiment

Now that, embodiments according to the present invention have been explained, the invention is not limited to the above-described embodiments and examples, but various modifications and changes of the invention can be made without deviating from the sprit and scope of the invention.

For example, each embodiment according to the present invention uses the EEPROM_ID as the location information for indicating the location of the information, the location information is not limited to the EEPROM_ID, detailed contents of the location information are not limited as long as the location storing the requested information (optional value) can be accessed.

In the second embodiment and the third embodiment according to the present invention, the examples of newly adding the option capable of being acquired or set by the PJL command with the option adding program are explained. However, additionally, registered content related to the added option may be deleted according to the necessary.

For example, it is preferable that the newly registered part related to the "COPYCOUNT" may be deleted from the newly registered option dictionary 89 when the operating panel 42 is pushed or the PJL command "@PJL DELPJL COPYCOUNT" for deleting is transmitted from the host 50 side.

In the second embodiment and the third embodiment according to the present invention, the newly registered option dictionary 89 is stored in the RAM 20. However, it is not limited to the RAM 20, and, for example, the newly registered option dictionary 89 may be stored in a CF 29 inserted in the media drive 28 or in a backup RAM (not shown in the drawings) which is operated by receiving the power from a battery which is built in the corresponding multi-function machine 10 (not displayed on the drawings). Therefore, the newly registered dictionary may be used longer than usual because the newly registered option dictionary 89 is not deleted and remained even the power supply of the multi-function machine 10 is cut.

Additionally, in the first embodiment according to the present invention of the processes of step S140 or S160 for the PJL receiving process in FIG. 6, it is explained if the option name included in the PJL command is not included in the option dictionary 76, the PJL process is terminated. However, the invention is not limited above-described processes, for example, it is preferable that the information (error information) indicating that the requested option is not included in the option dictionary 76 is responded to the host 50.

In the second embodiment according to the present invention of the PJL receiving process in FIG. 8, if the option is not included in the option dictionary 88 in the process in step S250 or S290, it is preferable that the information (error information) indicating that the option is not included in the option dictionary 88 is responded to the host 50. In the third embodiment according to the present invention of the PJL receiving process in FIG. 10, if the option is not included in the option dictionary 88 in the process in step S450 or S490, it is preferable that the information (error information) indicating that the option is not included in the option dictionary 88 is responded to the host 50.

Additionally, in each embodiment according to the present invention, the PJL command is displayed as the example of the command for acquiring or setting the information in the multi-function machine 10. However, the present invention is not limited to the above-described command based on the PJL and it may be applied to all sorts of commands capable of transmitting the command from the host 50 side and capable of corresponding to the host 50 side by acquiring (or changing the set) the contents information according to the command.

Also, the present invention is not limited to the above-described multi-function machine 10 and may be applied to a device information processing apparatus capable of supplying inside information or changing the set contents according to the command from the external device such as the host 50. The device information processing apparatus may be, for example, a printer apparatus having only printer function, a facsimile apparatus having minimum functions such as a telephone function and the facsimile function and so on, a copy apparatus having only the copy function. The device information processing apparatus additionally may be various kinds of things such as an image scanner, a digital camera, a USB camera, or each storage device.

What is claimed is:

1. An information processing apparatus comprising:
   a storage unit including a non-rewritable storage unit and a rewritable storage unit, the storage unit storing a command processing program which comprises a table part and an analyzing program part, and determines whether to acqiuire or set device information based on a command; and
   a controlling unit that controls the information processing apparatus based on the command processing program,
   wherein the rewritable storage unit stores the table part of the command processing program, the table part including a plurality of device information names, each of which indicates kind of the device information and a plurality of location information which corresponds to each of the plurality of device information names and indicates a location of the respective device information, and
   wherein the non-rewriteable storage unit stores the analyzing program part for analyzing contents of the command and acquiring location information of the device information from the table part based on the contents of the command.

2. The information processing apparatus according to claim 1,
   wherein the command Processing program further includes an executing program part which executes commands corresponding to the device information indicated by the device information name and the corresponding location information;
   wherein the analyzing program part determines whether a device information name corresponding to the device information of a requested object is included in the table part; and
   wherein the controlling unit executes an executing program corresponding to the device information of the requested object when the device information name corresponding to the device information of the requested object is included in the table part.

3. The information processing apparatus according to claim 2, wherein the non-rewritable storage unit stores the executing program part.

4. The information processing apparatus according to claim 2, wherein the executing program part executes a process corresponding to the device information in addition to a process corresponding to the contents of the command when the device information of the requested object is preliminary device information; and
   wherein the rewritable storage unit stores at least one portion of the executing program part.

5. The information processing apparatus according to claim 4, wherein the non-rewritable storage unit stores a remainder of the executing program part.

6. The information processing apparatus according to claim 1, further comprising:
   a device information storing unit which stores the device information,
   wherein the location information, which is associated with the device information name in the table part, indicates a location of the device information in the device information storing unit, and
   wherein the controlling unit executes a process corresponding to the contents of the command by accessing the device information storing unit according to the command processing program based on the location information.

7. The information processing apparatus according to claim 1, further comprising:
   an information adding unit which adds new device information,
   wherein the information adding unit creates an additional table which associates a device information name indicating device information of an additional instruction object with location information indicating a location of the device information corresponding to the additional instruction object for the new device information.

8. The information processing apparatus according to claim 7, further comprising:
   a device information storing unit which stores the device information,
   wherein the location information, which is associated with the device information name in the table part and the additional table, indicates a location of the device information in the device information storing unit, and
   wherein the controlling unit executes a process corresponding to the contents of the command by accessing the device information storing unit according to the command processing program based on the location information.

9. The information processing apparatus according to claim 7, further comprising:

an additional table storing unit which stores the additional table.

10. The information processing apparatus according to claim 7, wherein the additional instruction includes the device information name and the location information corresponding to the new device information to be added.

11. The information processing apparatus according to claim 7, wherein the corresponding information adding unit includes a corresponding information adding program stored therein.

12. The information processing apparatus according to claim 11, wherein the command processing program further includes the corresponding information adding program.

13. The information processing apparatus according to claim 1, wherein the information processing apparatus is capable of transmitting and receiving data with a plurality of external devices and receives the command from an external device of the plurality of the external devices.

14. The information processing apparatus according to claim 7, wherein the information processing apparatus is capable of transmitting and receiving data with a plurality of external devices and receives the command or the additional instruction from an external device of the plurality of the external devices.

15. The information processing apparatus according to claim 1, further comprising:

an image forming unit which forms an image in a recording medium based on print data, wherein the device information corresponding to the requested command includes information corresponding to an operation of the image forming unit.

16. The information processing apparatus according to claim 1, wherein the non-rewritable storage unit is a mask read only memory (ROM) and the rewritable storage unit is a flash ROM.

17. A multi-function apparatus comprising:

a storage unit comprising a mask ROM and a flash ROM, the storage unit storing a command processing program which comprises a table part and a command option recognizing program, and determines whether to acquire or set an option based on a command; and a controlling unit that controls the multi-function apparatus based on the command processing program, wherein the flash ROM stores the table part of the command processing program, the table part including a plurality of option names, each of which indicates a kind of the option name, and a plurality of the location information which corresponds to each of the plurality of option names and indicates a location of the respective option, wherein the mask ROM stores the command option recognizing program for analyzing contents of the command and acquiring location information of an option from the table unit based on the contents of the command, wherein the command processing program further comprises an executing program part which executes commands corresponding to the option indicated by the option name and the corresponding location information, wherein the command option recognizing program determines whether an option name corresponding to the option of a requested object is included in the table part, and wherein the controlling unit executes an executing program corresponding to the option of the requested object when the option name corresponding to the option of the requested object is included in the table part.

* * * * *